United States Patent [19]

Deisch

[11] Patent Number: 4,914,559
[45] Date of Patent: Apr. 3, 1990

[54] POWER FACTOR IMPROVING ARRANGEMENT

[75] Inventor: Cecil W. Deisch, Warrenville, Ill.

[73] Assignee: American Telephone and Telegraph Company, New York, N.Y.

[21] Appl. No.: 331,094

[22] Filed: Mar. 27, 1989

Related U.S. Application Data

[63] Continuation of Ser. No. 145,072, Jan. 19, 1988, abandoned.

[51] Int. Cl.$^4$ ............................................. H02M 1/12
[52] U.S. Cl. ........................................ 363/48; 363/17; 363/126
[58] Field of Search ..................... 363/16, 17, 39, 46, 363/47, 48, 98, 126; 323/208

[56] References Cited

U.S. PATENT DOCUMENTS

| | | | |
|---|---|---|---|
| 1,696,880 | 12/1928 | Donle | 363/47 |
| 1,920,948 | 8/1933 | Crouse | 363/47 X |
| 3,906,337 | 9/1975 | Depenbrock | 363/48 |
| 4,222,096 | 9/1980 | Capewell | 363/126 X |
| 4,369,490 | 1/1983 | Blum | 363/48 |
| 4,412,277 | 10/1983 | Mitchell | 363/81 |
| 4,672,522 | 6/1987 | Lesea | 363/126 X |
| 4,679,129 | 7/1987 | Sakakibara et al. | 363/98 X |

FOREIGN PATENT DOCUMENTS

| | | | |
|---|---|---|---|
| 0560076 | 7/1958 | Canada | 363/48 |
| 1130082 | 10/1968 | United Kingdom | 363/59 |

OTHER PUBLICATIONS

G. J. Scoles, *Handbook of Rectifier Circuits* (John Wiley & Sons, 1980), pp. 169–171.

W. Shepherd et al., *Energy Flow and Power Factor in Non-Sinusoidal Circuits*, (Cambridge Univ. Press, 1979), pp. 234–258.

S. Smith, "A Universe of Ideas—Power Factor Correction—I", PCIM, Jan. 1987, p. 31.

S. Smith, "A Universe of Ideas—Power Factor Correction—II", PCIM, Feb. 1987, p. 64.

S. Smith, "A Universe of Ideas—Power Factor Correction—III", PCIM, Mar. 1987, p. 47.

*Primary Examiner*—Patrick R. Salce
*Assistant Examiner*—Kristine Peckman
*Attorney, Agent, or Firm*—David Volejnicek

[57] ABSTRACT

A power factor compensator (18) for a power converter (17) comprises an L-C circuit connected in series between the power converter and the converter's A.C. power source (13). The values of the inductor (30) and the capacitor (31) of the compensator circuit are selected to cause the L-C circuit to resonate at a frequency higher than the power source frequency, preferably at a frequency ranging between 1.4 and 3.5 times the power source frequency, in order to achieve a power factor within the range of about 0.65 to 0.95. A resonant frequency of about twice the power source frequency has been experimentally found to give particularly good performance.

15 Claims, 2 Drawing Sheets

POWER FACTOR IMPROVING ARRANGEMENT

This application is a continuation of application Ser. No. 07/145,072, filed on Jan. 19, 1988, now abandoned.

TECHNICAL FIELD

The invention relates generally to power supplies and particularly to the power factor of power converters.

BACKGROUND OF THE INVENTION

A typical power converter—a rectifier, generally followed by a power conditioner—which operates off of A.C. lines directly rectifies the voltage and stores energy on large input capacitors. As a consequence, it draws current from the A.C. lines in narrow but large current pulses, thereby yielding a poor power factor.

The power factor (P.F.) is the preferred method of measuring the efficiency of power passing through a point in a power distribution system. The power factor is the ratio of the average power, or true power, measured in watts, to the apparent power, measured in volt-amperes, drawn by a circuit. It is expressed as follows:

$$P.F. = \frac{\text{actual input power}}{(\text{input RMS voltage}) \times (\text{input RMS current})}$$

Typically, the power factor measure is applied to A.C. distribution systems in which the voltages and currents are substantially sinusoidal, though usually not in phase. In such systems, the power factor is simply calculated as the cosine of the phase angle between the current and the voltage.

Power is distributed most efficiently when the actual power delivered to a load equals the product of the input RMS voltage and current, i.e., when the power factor equals 1. However typical power factor values for power converters range from about 0.75 to less than 0.5.

Low power factor is compensated for by high current drawn by the converter in order to supply sufficient power to a load. Undesirable consequences of low power factor include (a) increased impendance losses, (b) the need for larger-capacity and more robust A.C. power distribution system components (e.g., circuit breakers, transformers, and wiring) that are capable of handling the power converter's high RMS current demands, (c) the need for larger and more robust rectifier diodes, storage capacitors, and wiring in the power converter to handle the power surges, and (d) greater difficulty and expense of meeting safety (e.g. Underwriter's Laboratories) requirements. Not only is the cost of power distribution increased thereby, but the cost of the power itself may be increased, because some users must pay not on the basis of the actual power consumed but on the basis of apparent power consumed. Clearly, then, it is desirable to improve the power factor of power converters.

The prior art does provide circuits for power factor compensation. For example, W. Shepherd and P. Zand suggest certain such circuits in Ch. 11 of their book *Energy Flow and Power Factor in Nonsinusoidal Circuits,* Cambridge University Press, 1979. Most are shunt circuits, both linear and nonlinear. These shunt circuits tend to be only marginally effective in improving the power factor. Several series-compensation schemes are also described, but they are complex, costly, and often unreliable active networks that supply the harmonic frequency content of the rectified load current so that the A.C. lines have to supply only the current at the fundamental frequency.

A compensation circuit that avoids the disadvantages of those proposed by Shephard and Zand is presented by G. J. Scoles in Ch. 18 of the *Handbook of Rectifier Circuits,* John. Wiley & Sons, 1980. He describes a "tuned bridge rectifier" in which an L-C circuit is placed in series between the A.C. lines and the rectifier, which L-C circuit is specifically tuned to resonate at the A.C. line frequency. This circuit has serious drawbacks of its own, however. With variations in load on the rectifier, the rectified voltage varies significantly—on the order of 30% between no load or light load and normal load (of about $\pi/2\sqrt{LC}$)—which is an unacceptably high variance for most applications. At high loads, and particularly during start-ups, overloads, or short-circuits, the voltages and the current peaks across both the inductor and the capacitor of the L-C circuit get very large and are likely to damage both the inductor and the capacitor unless very robust, and hence very expensive, components are used that can withstand the surges and avoid breakdown.

A better solution than those hitherto proposed by the art is therefore required for improvement of power factor of power converters.

SUMMARY OF THE INVENTION

The invention is directed to solving these and other problems of the prior art. According to the invention, an arrangement for improving the power factor of an apparatus that draws power from an A.C. power source—such as an off-A.C. line power converter—comprises an L-C circuit connected in series between the apparatus and the power source, which circuit is tuned to resonate at a frequency higher than the power source frequency. Preferably, the resonant frequency falls within a range of frequencies from 1.4 times the source frequency to 3.5 times the source frequency. A highly-desirable resonant frequency has been found to be about two times the source frequency. Empirically derived formulas for the desirable values of the inductors and capacitors are as follows $$L \approx \frac{.238R}{f} e^{12.8 \times PF} \text{ microhenries, and}$$

$$C \approx \frac{104}{R \times f} e^{-6.38 \times PF} \text{ farads, where}$$

PF is the desired power factor,
f is the input power frequency in hertz, and
R is the load impedance in ohms.

The arrangement reduces the RMS current drawn by the apparatus, thereby improves the power factor of the A.C.-powered apparatus, and hence eliminates or lessens the problems caused by a low power factor, described above. In particular, the arrangement generally improves the efficiency of the A.C.-powered apparatus; decreases the apparatus' power losses, particularly in equivalent series resistance (ESR) of any input capacitors, rectifier diodes, line filters, and power cords of the apparatus; reduces the capacity requirements of the A.C. power distribution system components by lowering the apparatus' peak power demands; and reduces the strain on, and hence the cost and the capacity requirements of, any rectifier diodes, storage capacitors, and wiring of the apparatus. Because the applicability of progressively more stringent safety requirements is generally dependent upon maximum RMS currents that may exist in the apparatus, the power factor improvement makes it easier and less expensive to meet applicable safety requirements. In addition, the arrangement provides inrush and short-circuit current protection.

Furthermore, the power factor-improving arrangement with unchanged component values is often suited for use with a variety of input power frequencies, particularly with both 50 and 60 Hz, and hence it does not require redesign or change to accommodate the power frequency differences that exist between nations. The arrangement causes only a slight drop in the output voltage—approximately 4.5%. It also tends to keep input current and voltage in phase. During overloads or short circuits, the arrangement automatically limits the current to levels which are unlikely to cause damage or nuisance events such as fuse blowing, and during start-ups the network also automatically limits to an acceptable value the inrush current that would otherwise be drawn by a typically-large rectifier capacitor, and hence eliminates the need for additional "soft start" circuitry that is typically used with such rectifiers. Moreover, the arrangement can be constructed of only passive and well-known components—inductors and capacitors—and hence it is simple and reliable.

These and other advantages and features of the present invention will become apparent from the following description of an illustrative embodiment of the invention taken together with the drawing.

DETAILED DESCRIPTION

Figure 1:
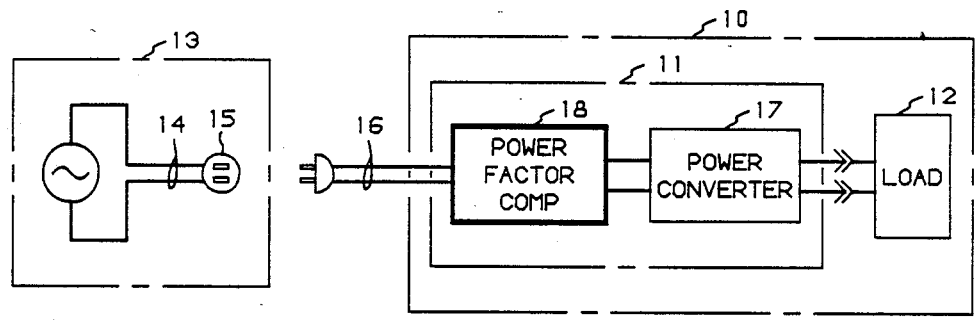
FIG. 1 is a block diagram of a system embodying an illustrative example of the present invention.

FIG. 1 shows an illustrative system 10 embodying an illustrative embodiment of the invention. System 10 comprises a power supply 11, and a load 12 connected to the power supply. Illustratively, system 10 is a computer system, load 12 represents the computer itself, and power supply 11 is the power supply that drives the computer.

Further as indicated in FIG. 1, system 10 is plugged into a source of A.C. power 13. Illustratively, power source 13 includes conventional building power lines 14 and a wall socket 15, and system 10 is plugged into socket 15 by means of a power cord 16.

Figure 2:
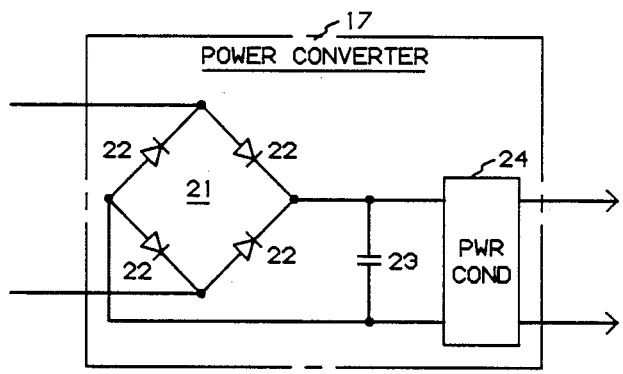
FIG. 2 is a circuit diagram of the power converter of the system of FIG. 1.

Power supply 11 includes a power converter 17. Power converters are known in the art, but for purposes of completeness of discussion, an illustrative power converter is shown in FIG. 2. It comprises a conventional rectifier bridge 21 made up of four diodes 22, a storage capacitor 23, and a conventional power conditioner 24 such as a DC-AC or a DC-DC converter.

Power supply 11 also includes a power factor compensator 18 which is interposed between power converter 17 and power source 13, and which functions to improve the power factor of power converter 17, and hence of power supply 11. Whereas a conventional power supply—one without compensator 18—typically draws current from power supply 13 in narrow but very large current pulses, the use of compensator 18 substantially widens, and reduces the magnitude of, the current pulses without significantly affecting the phase relationship of the current and the voltage.

Figure 3:
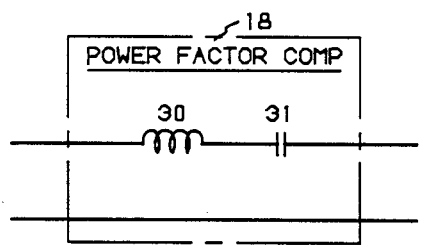
FIG. 3 is a circuit diagram of the basic configuration of the power factor compensator of the system of FIG. 1.
Figure 4:
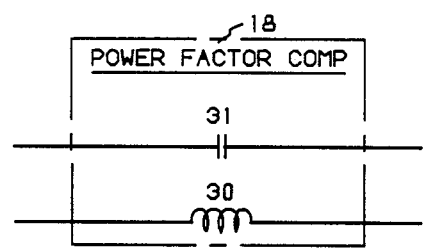
FIGS. 4–10 are circuit diagrams of alternative configurations of the power factor compensator of the system of FIG. 1.

The basic structure of compensator 18 is shown in FIG. 3; it comprises an inductor 30 and a capacitor 31 connected in series with power converter 17 and power source 13. Safety considerations dictate that inductor 30 and capacitor 31 be connected in series with the power leg of the connection between supply 13 and converter 17, leaving the ground connection a straight-through connection. However, from a functional standpoint, inductor 30 and capacitor 31 may be connected instead with the ground leg of the connection, or inductor 30 may be connected with one leg of the connection while capacitor 31 may be connected with the other leg, as shown in FIG. 4.

Figure 5:
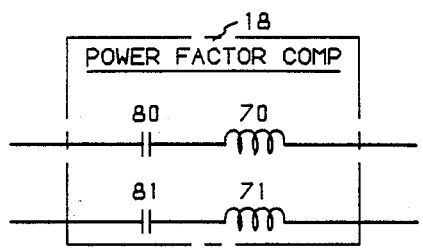
Figure 6:
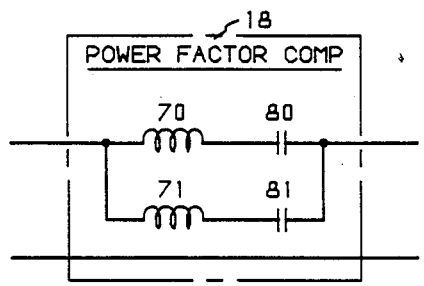

Further permutations on the basic configuration are possible: a plurality of inductors 70, 71 and capacitors 80, 81 may be used, whose combined values in the circuit of compensator 11 reduce to the value of inductor 30 and capacitor 31 connected as shown in FIG. 3. One such possible arrangement is shown in FIG. 5, where one inductor-capacitor pair 70, 80 is connected in series with the power leg of the connection between supply 13 and converter 17, and another inductor-capacitor pair 71, 81 is connected in series with the ground leg. Another such possible arrangement is shown in FIG. 6, where two inductor-capacitor pairs 70, 80 and 71, 81 are connected into a leg of the connection between supply 13 and converter 7 in parallel with each other. Each of these L-C pairs may then be tuned to a different frequency.

Significantly, in a departure from the prior art, inductor 30 and capacitor 31 are tuned, i.e., their relative values are selected, to resonate at a frequency not equal to, but higher than, the frequency of power source 13. Desirably, the selected resonant frequency falls within a range of frequencies from 1.4 times the source frequency to 3.5 times the source frequency. Depending on the weighting of different parameters such as (1) the amount of improvement desired in the power factor, (2) the amount of allowable drop caused by compensator 18 in rectified voltage, (3) the peak current limit for overloads, (4) the maximum allowable voltage across capacitor 31, and (5) the maximum current allowable through inductor 30, there is a range of acceptable resonant frequencies, and hence a range of acceptable values of inductor 30 and capacitor 31. Experimentally, it has been found that very good performance with respect to the above-mentioned parameters is obtained with a resonant frequency of about two times the power source 13 frequency. Because power source 13 frequencies of both 50 Hz and 60 Hz are common, a resonant frequency of about 110 Hz serves quite well for both power source frequencies. Empirically-derived formulas for the desirable values of inductor 30 and capacitor 31 are as follows:

$$L \approx \frac{.238R}{f} e^{12.8 \times PF} \text{ microhenries, and}$$

$$C \approx \frac{104}{R \times f} e^{-6.38 \times PF} \text{ farads, where}$$

PF is the desired power factor,
f is the source frequency in hertz, and
R is the load 12 impedance in ohms.

As the formulas suggest, compensator 18 need not be a finely-tuned circuit; rather, there is a significant tolerance allowed on the values of inductor 30 and capacitor 31 which still meet the basic power factor objectives. Of course, inductor and capacitor values selected from the tolerance range yield a slightly lower than the desired P.F. value. Examples of reasonable tolerances for the values are ±30% for the capacitance value and ±30% for the inductance value. The acceptable tolerances allow use of relatively-cheap components for constructing compensator 18, and permit the interchangeable use of a particular compensator 18 for both 50 Hz and 60 Hz power supply systems.

Figure 7:
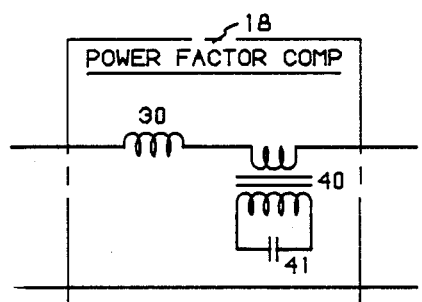

Of course, a plurality of smaller capacitors connected either in parallel or in series may be used instead of capacitor 31. However, from a cost standpoint, it may be preferable to use a step-up transformer in conjunction with a single capacitor to achieve the equivalent of the desired capacitance. This arrangement is shown in FIG. 7. As shown, the primary winding of a step-up transformer 40 is connected in series with inductor 30, in place of capacitor 31. A capacitor 41 is connected across the secondary winding of transformer 40. Assuming transformer 40 to be a 1:N step-up transformer, the capacitance of capacitor 41 is $N^2/C$, where C is the capacitance of capacitor 31 that has been replaced by transformer 40 and capacitor 41. The value of N may be either greater than 1, for a step-up voltage transformer, or less than one, for a step-up current transformer.

Figure 8:
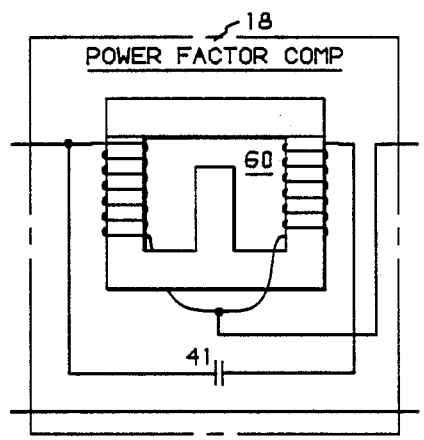

It may further be economically advantageous to combine inductor 30 and transformer 40 of FIG. 7 into a single magnetic structure. Such combined structures are known in the art. An illustrative example thereof in the context of compensator 18 is shown in FIG. 8. The arrangement uses a transformer 60 having a single folded winding. The power input of compensator 18 is coupled to the input lead of transformer 60 and to one lead of capacitor 41. The output lead of transformer 60 is connected to the other lead of capacitor 41, and power output of compensator 18 is coupled to the tap of transformer 60.

Figure 9:
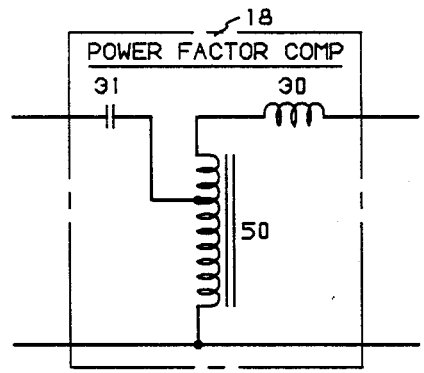
Figure 10:
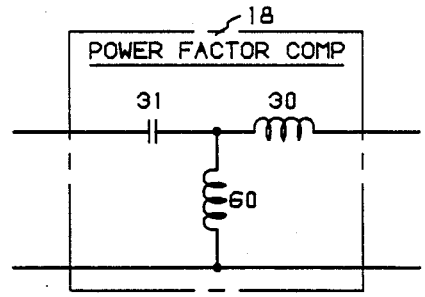

Compensator 18 does result in a small voltage drop at the output of converter 17. If necessary, this drop may be offset in several ways. One way, illustrated in FIG. 9, uses a step-up transformer 50. In this arrangement, the output of capacitor 31 is connected to a tap of transformer 50. One end of the winding of transformer 50 is connected to the input of inductor 30. The other end of the winding is connected to the return line, or ground. Another way, illustrated in FIG. 10, uses an inductor 60 instead of transformer 50. Inductors 60 and 30 are not magnetically coupled. The value of inductance of inductor 60 is large relative to that of inductor 30, illustratively on the order of 50 times the value of inductor 30. One end of inductor 60 is connected to the output of capacitor 31 and to the input of inductor 30, and the other end is connected to the return line, or ground.

Of course, it should be understood that various changes and modifications to the illustrative embodiment described above will be apparent to those skilled in the art. For example, a non-linear inductor may be used to good advantage and allowed to partly saturate during overload, to reduce the peak voltage across the capacitor. Such changes and modifications can be made without departing from the spirit and the scope of the invention and without diminishing its attendant advantages. It is therefore intended that all such changes and modifications be covered by the following claims.

What is claimed is:

1. An arrangement for improving power factor of a rectifier drawing power from a power source having a substantially sinusoidal voltage with an operating frequency, comprising:
    in combination, first inductive means and capacitive means connected in series with each other and for connection in series between a rectifier drawing power from a power source and the power source having a substantially sinusoidal voltage and tuned to resonate at a frequency higher than the frequency of the voltage to improve the power factor of the rectifier.

2. The arrangement of claim 1 wherein the inductive means consist of at least one inductor and wherein the capacitive means consist of at least one capacitor.

3. The arrangement of claim 1 wherein the capacitive means comprise:
    a step-up transformer having a primary winding connected in series between the rectifier and the source, and further having a secondary winding; and
    a capacitor connected in parallel with the secondary winding.

4. The arrangement of claim 3 wherein the transformer and the inductive means are incorporated into a single magnetic structure comprising a capacitor having one terminal connected to the source and a transformer having a tapped single folded winding one end of which winding is connected to the source and the other end of which winding is connected to the other terminal of the capacitor and the tap of which winding is connected to the rectifier.

5. The arrangement of claim 1 further comprising:
    second inductive means connected in series with the capacitive means and in parallel with a combination of the first inductive means and the rectifier.

6. The arrangement of claim 1 further comprising:
    a transformer having a winding connected in parallel with a combination of the inductive means and the rectifier and having a tap connected to the capacitive means, and a portion of the winding being connected in series between the capacitive means and the inductive means.

7. The arrangement of claim 1 wherein the resonant frequency is two times the voltage frequency.

8. The arrangement of claim 1 wherein the capacitive means have a capacitance of $$\frac{10^4}{R \times f} e^{-6.38 \times PF}$$

farads ±30%
and wherein
    the inductive means have an inductance of $$\frac{.238 R}{f} e^{12.8 \times PF}$$

microhenries ±30%,
where
    PF is a desired value of the power factor,
    f is the frequency of the voltage in hertz, and
    R is an impedance of a load on the output of the rectifier in ohms.

9. An arrangement for improving power factor of a rectifier drawing power from a power source having an alternating voltage frequency, comprising:

in combination, inductive means and capacitive means connected in series with each other and for connection in series between a rectifier drawing power from a power source and the source and tuned to resonate at a frequency higher than an allernating voltage frequency of said power source wherein the capacitive means have a capacitance of $$\frac{104}{R \times f} e^{-6.38 \times PF}$$

farads ±30%,
and wherein
the inductive means have an inductance of $$\frac{.238R}{f} e^{12.8 \times PF}$$

microhenries ±30%,
where
PF is a desired value of the power factor,
f is the voltage frequency in hertz, and
R is an impedance of a load on the output of the rectifier in ohms.

10. The arrangement of claim 9 wherein the resonant frequency falls within a range of 1.4 times the voltage frequency and 3.5 times the voltage frequency.

11. A power supply comprising:
means for connecting to a power source having substantially sinusoidal alternating voltage with an operating frequency;
means coupled to the connecting means for rectifying the alternating voltage; and
a circuit comprising inductive means and capacitve means connected in series with each other, the circuit serially interposed between the connectinng means and the rectifying means and tuned to resonate at a frequency higher than the frequency of the alternating voltage to improve the power factor of the power supply.

12. The power supply of claim 11 wherein the resonant frequency is two times the voltage frequency.

13. The power supply of claim 11 wherein the capacitive means have a capacitance of $$\frac{104}{R \times f} e^{-6.38 \times PF}$$

farads ±30%,
and wherein
the inductive means have an inductance of $$\frac{.238R}{f} e^{12.8 \times PF}$$

microhenries ±30%,
where
PF is a desired value of the power factor,
f is the frequency of the voltage in hertz, and
R is an impedance of a load on the output of the rectifying means in ohms.

14. A power supply comprising:
means for connecting to a power source having an alternating voltage with an operating frequency;
means coupled to the connecting means for rectifying the alternating voltage; and
a circuit comprising inductive means and capacitive means connected in series with each other, the circuit serially interposed between the connecting means and the rectifying means and tuned to resonate at a frequency higher than the frequency of the alternating voltage wherein the capacitive means have a capacitance of $$\frac{104}{R \times f} e^{-6.38 \times PF}$$

farads ±30%,
and wherein
the inductive means have an inductance of $$\frac{.238R}{f} e^{12.8 \times PF}$$

microhenries ±30%,
where
PF is a desired value of the power factor,
f is the voltage frequency in hertz, and
R is an impedance of a load on the output of the rectifying means in ohms.

15. The power supply of claim 14 wherein the resonant frequency falls within a range of 1.4 times the voltage frequency and 3.5 times the voltage frequency.

* * * * *